(12) United States Patent
Murayama (10) Patent No.: US 7,787,781 B2
(45) Date of Patent: Aug. 31, 2010

(54) OPTICAL RECEIVER RELIABLY DETECTABLE LOSS-OF-SIGNAL STATE

(75) Inventor: Tetsu Murayama, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 743 days.

(21) Appl. No.: 11/593,138

(22) Filed: Nov. 6, 2006

(65) Prior Publication Data

US 2007/0104494 A1  May 10, 2007

(30) Foreign Application Priority Data

Nov. 7, 2005   (JP) .............................. 2005-322486

(51) Int. Cl.
  *H04B 10/06* (2006.01)
  *H01S 3/00* (2006.01)
(52) U.S. Cl. ..................... 398/210; 398/202; 372/38.02
(58) Field of Classification Search ................. 398/210, 398/208, 202, 25
  See application file for complete search history.

(56) References Cited

U.S. PATENT DOCUMENTS 7,046,087 B1 *  5/2006  Naik et al. .................. 330/136

2002/0009109 A1 *  1/2002  Asano ..................... 372/38.02
2002/0063937 A1 *  5/2002  Kikuchi .................... 359/189
2007/0036541 A1 *  2/2007  Tanaka ......................... 398/1

OTHER PUBLICATIONS

"INF-8074 specification for SFP (Small Form Factor Pluggable Transceiver Rev. 1.0", May 12, 2001; ftp://ftp. Segate/com/sff/ING-8074. pdf; by the SFF committee.

* cited by examiner

*Primary Examiner*—Ken N Vanderpuye
*Assistant Examiner*—Oommen Jacob
(74) *Attorney, Agent, or Firm*—Venable LLP; Michael A. Sartori; Steven J. Schwarz (57) ABSTRACT

The present invention is to provide an optical receiver that prohibits the miss-detection of the recovery from the LOS (Loss-Of-Signal) state. The optical receiver includes an light-receiver device for converting an optical input signal to a photo-current, a pre-amplifier for converting this photo-current into a voltage signal, and a LOS detector to detect the LOS state based on the output from the pre-amplifier. The LOS detector includes a bottom hold that detects and keeps the bottom level of the output from the pre-amplifier and the comparator that sets the output thereof when the output from the bottom hold exceeds the threshold $V_{TH(-)}$.

2 Claims, 6 Drawing Sheets

OPTICAL RECEIVER RELIABLY DETECTABLE LOSS-OF-SIGNAL STATE

BACKGROUND OF THE INVENTION

1. Field of the Invention

The present invention relates to an optical receiver applicable in the optical communication.

2. Related Prior Art

A SFP (Small Form-Factor Pluggable) link has been widely spreading as one type of optical transceivers. For instance, a home page on the internet, "INF-8074 specification for SFP (Small Form Factor Pluggable Transceiver Rev. 1.0", May 12, 2001; ftp://ftp.seagate/com/sff/ING-8074.pdf; by the SFF committee, has disclosed a specification of such a transceiver.

The SFP transceiver is requested to have a function that, when the optical input signal becomes less than intensity specified by the standard due to the breakdown or the miss connecting of the optical fiber, or due to the failure of the optical transmitter, the transceiver sets a LOS (Loss Of Signal) alarm. In addition to the function mentioned above, the optical transceiver is necessary to reset the LOS alarm when the optical input signal recovers and the intensity thereof exceeds a specific value. The specification of the SFP transceiver requests that the setting and the resetting of the LOS alarm is carried out within 100 μs from the disappearance or the recovery of the optical signal.

Conventional optical receiver detects the LOS state by the amplitude of AC components of the electrical signal converted from the optical input signal. Accordingly, when an optical signal is input in step-like at the LOS state, the receiver may miss the setting of the LOS alarm because an electronic circuit within the receiver miss-operates at a leading edge of the step-like optical signal, which temporarily resets the LOS alarm. Moreover, when the optical signal configures, what is called, a burst mode signal with substantial intensity, a situation, in which the optical signal is regarded to be interrupted, may occur at the leading edge of the burst signal, which leads the optical receiver to set the LOS alarm.

Specifically, the optical receiver, in particular, a pre-amplifier in the optical receiver, generally provides an auto-gain-control (AGC) function to maintain an amplitude of the output signal thereof constant. In such an optical receiver, when the optical signal recovers from the LOS state, that is, at leading edge of the burst signal, the gain of the pre-amplifier set by the AGC gets into an excess state until an optimum value is reached from the maximum. Consequently, the pre-amplifier generates an output with a step-like form just after the recovery of the optical input signal because the pre-amplifier saturates the output thereof in the highest level. Because the LOS alarm is derived from the AC component of the output from the pre-amplifier, the receiver temporarily repeats the reset and set of the LOS alarm following the output behavior of the pre-amplifier, and finally, resets the LOS alarm by the gain of the pre-amplifier stable in an optimum value. Thus, the conventional optical receiver does not provide a function to reliably detect the recovery of the optical signal from the LOS state.

SUMMARY OF THE INVENTION

An optical receiver according to the present invention has a feature that the receiver comprises a light-emitting device, a pre-amplifier, and a detector. The light-emitting device, typically a semiconductor photodiode, converts an optical signal into a corresponding photo-current. The pre-amplifier converts the photo-current into a voltage signal. The detector, coupled with the pre-amplifier in the AC mode via a coupling capacitor, is configured to detect a state where the optical signal decreases its level. In the present invention, the detector preferably provides a bottom hold, configured to detect and hold the minimum level of an output of the pre-amplifier, and a first comparator configured to compare an output of the bottom hold with a first reference and to generate a first alarm when the output of the bottom hold is greater than the first reference.

In the optical receiver of the present invention, even when the output of the pre-amplifier varies in step-like at the recovery of the optical signal from the LOS state, the detector may be escaped from an erroneous detection at a leading edge of the step-like signal, accordingly, the optical receiver may securely and reliably detect the recovery of the optical signal from the LOS state.

The optical receiver of the present invention may further include a peak hold, which is configured to detect and hold a maximum level of the output of the pre-amplifier, and a second comparator, which is configured to generate, by comparing an output of the peak hold with a second reference, a second alarm when the output of the peak hold is less than the second reference. In such a configuration, even when the output of the pre-amplifier varies in step-like at an interruption of the optical signal, the detector may be escaped from an erroneous detection regarded as the LOS state. Accordingly, the optical receiver may securely and reliably detect the transition of the optical signal from the normal state to the LOS state.

Moreover, the detector may further include a selector configured to select one of the output of the first and second comparators and to output an alarm signal. The selector selects one of the outputs of the comparators depending on a state of the alarm signal, namely, depending on a level thereof. Thus, according to the optical receiver of the present invention, even when the pre-amplifier is coupled with the detector in the AC mode via a coupling capacitor, the recovery of the optical signal from the LOS state and the change of the optical signal from the normal state to the LOS may be reliably and effectively detected.

BRIEF DESCRIPTION OF DRAWINGS

FIGS. 2A to 2D show time charts of signals processed by the optical receiver shown in FIG. 1, specifically.

FIGS. 3A to 3E show time charts of signals processed by the optical receiver shown in FIG. 1, specifically.

FIGS. 4A to 4E show time charts of signals processed by the optical receiver shown in FIG. 1, specifically.

FIG. 6 show time charts of signals processes by the optical receiver shown in FIG. 5, specifically.

DESCRIPTION OF PREFERRED EMBODIMENTS

Next, preferred embodiments of the present invention will be described as referring to accompanying drawings. In the description, the same numerals or symbols will refer to the same elements without overlapping explanations.

Figure 1:
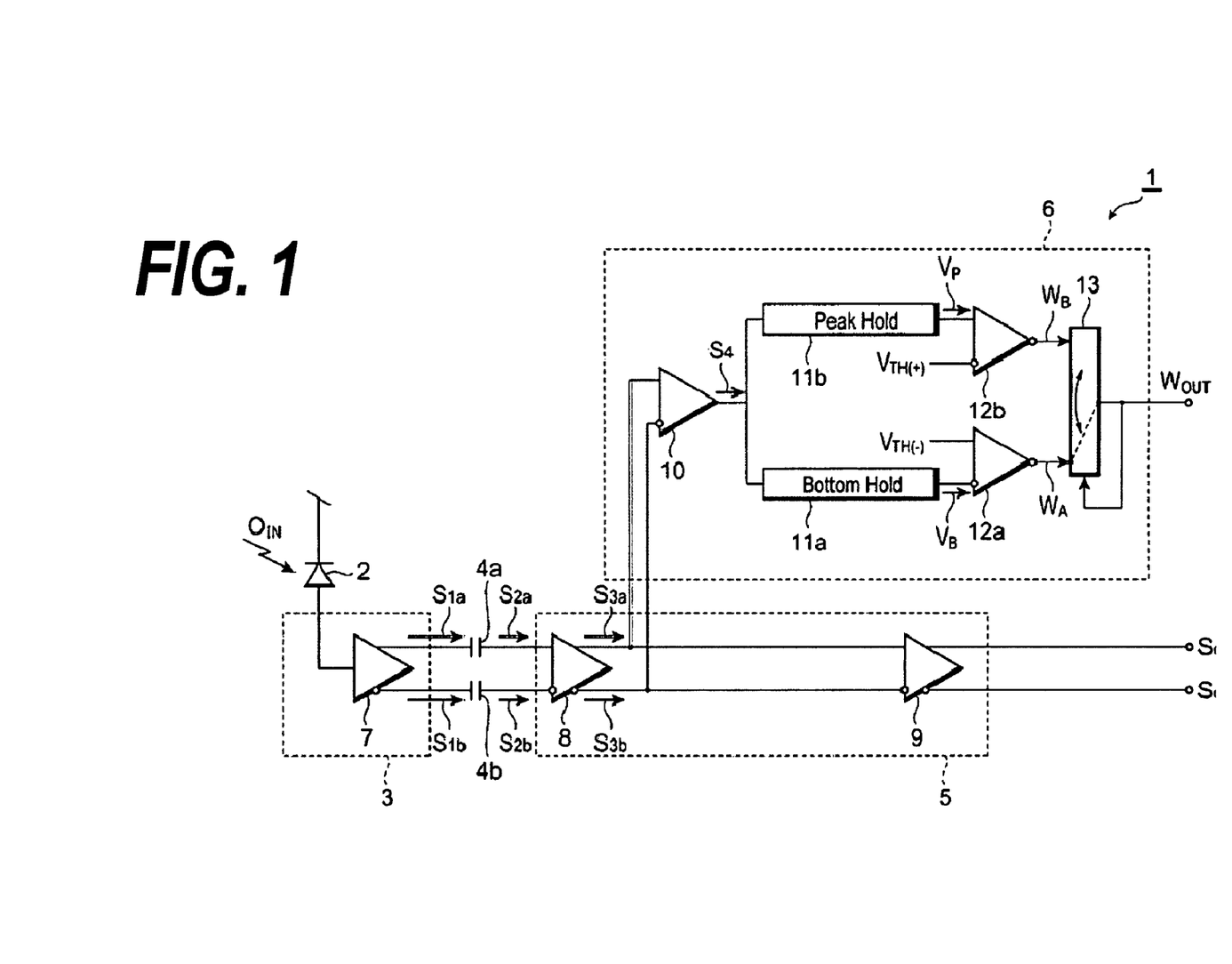
FIG. 1 is a circuit diagram of an optical receiver according to an embodiment of the present invention.

FIG. 1 is circuit diagram of an optical receiver according to one embodiment of the present invention. The optical receiver 1 shown in FIG. 1 is an apparatus to convert an optical signal $O_{IN}$ input from an optical fiber into an electrical signal. The optical receiver 1 comprises a light-receiving device 2 such as a semiconductor photodiode, a pre-amplifier 3, coupling capacitors, 4a and 4b, a post-amplifier 5, and a LOSS-OF-SIGNAL (LOS) detector 6. The light-receiving device 2 generates, by receiving the optical signal $O_{IN}$, a photo-current depending on the intensity of the optical signal. The pre-amplifier 3 converts the photo-current output from the light-receiving device 2 into a pair of signals, S1a and S1b, with normal and reverse phases, respectively, which are, what is called, a complementary signal. Two coupling capacitors, 4a and 4b, connect the pre-amplifier 3 to the post-amplifier 5 and the LOS detector 6 in an AC mode.

The pre-amplifier 3 provides a current-to-voltage converter 7 (hereinafter denoted as I/V-C) that converts the photo-current output from the light-receiving device 2 into a voltage signal. The I/V-C 7 is configured with a variable gain function to maintain the amplitude of the voltage output thereof with a preset time constant, and outputs a pair of signals, S1a and S1b, with normal and reverse phases, respectively.

The coupling capacitor 4a connected receiving the normal phase output S1a of the pre-amplifier eliminates a DC component of the signal S1a and passes only AC components thereof to the post-amplifier 5 to output the normal phase signal S2a. While, the other capacitor 4b, eliminating the DC component from the reverse phase signal S1b, passes only AC components to the post-amplifier to output the reverse phase signal S2b.

The post-amplifier 5 includes two differential amplifiers, 8 and 9, and the first differential amplifier 8 receives the normal phase signal S2a via the capacitor 4a in the normal phase input thereof, while receives the reverse phase signal S2b via the capacitor 4b in the reverse phase input thereof. This first differential amplifier generates, based on thus received normal and reverse phase signals, the amplified and reformed normal and reverse phase signals, S3a and S3b.

The LOS detector 6 generates the LOS alarm and comprises of a differential amplifier 10, a bottom hold 11a, a peak hold 11b, first and second comparators, 12a and 12b, and a selector 13.

The differential circuit 10, the non-inverting and the inverting inputs thereof are connected to the normal and reverse phase outputs of the differential circuit 8 of the post-amplifier, receives the normal phase signal S3a in the non-inverting input, while, receives the reverse phase signal S3b in the inverting input. Thus, the differential amplifier 10 outputs, by amplifying these signals, S3a and S3b, in the differential mode, the normal phase signal S4.

The output of the differential circuit 10 is concurrently led to the bottom hold 11a and the peak hold 11b. The bottom hold 11a detects and holds the minimum of the normal phase signal S4 to output the bottom signal $V_B$. While, the peak hold 11b is configured to detect and hold the maximum of the normal phase signal S4 to output the peak signal The bottom signal $V_B$ output from the bottom hold 11a is led to the inverting input of the comparator 12a, while, the non-inverting input of the comparator 12a receives the first reference $V_{TH(-)}$. The comparator, by comparing the first reference $V_{TH(-)}$ with the bottom signal $V_B$, is configured to set the output thereof when the bottom signal $V_B$ is greater than the first reference $V_{TH(-)}$, while, to reset the output when the bottom signal $V_B$ is smaller than the first reference $V_{TH(-)}$. This first reference $V_{TH(-)}$ is preset so as to be less than the average of the normal phase signal S4, that is, the DC level of the output S4 from the differential circuit 10, namely, the DC level of the normal phase signal S4.

On the other hand, the peak signal $V_P$ output from the peak hold 11b is led to the non-inverting input of the other comparator 12b, while, the inverting input thereof receives the second reference $V_{TH(+)}$. The second comparator 12b, by comparing the second reference $V_{TH(+)}$ with the peak signal $V_P$, sets the output $W_B$ thereof when the peak signal is less than the second reference $V_{TH(+)}$, while, resets the output $W_B$ when the peak signal exceeds the second reference $V_{TH(+)}$. The second reference $V_{TH(+)}$ is set to be greater than the average of the normal phase signal S4, that is, a value greater than the DC level of the normal phase signal S4.

Each output of two comparators, 12a and 12b, is connected to the selector 13 that is configured to select one of the outputs from comparators, 12a and 12b and to output the LOS alarm $W_{OUT}$ to the outside depending on the LOS alarm. Specifically, the selector 13 selects the output of the first comparator 12a when the LOS alarm is set in the previous event just before the predetermined time $\Delta t$, while selects the output of the second comparator 12b when the LOS alarm is reset in the previous event. The predetermined time $\Delta t$ is preferably set to be enough greater than the response of the auto-gain-control of the pre-amplifier.

Next, time chars of various nodes of the optical receiver will be described as referring to FIGS. from 2 to 4.

Figure 2A:
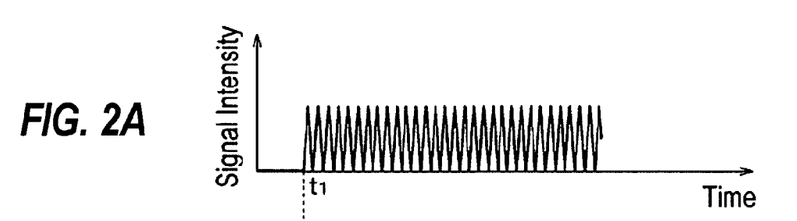
FIG. 2A is intensity of optical input signal.
Figure 2B:
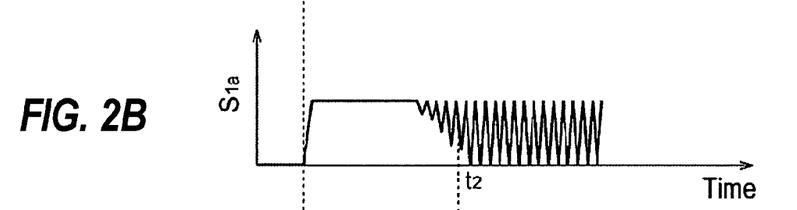
FIG. 2B is an output with a normal phase from the pre-amplifier.
Figure 2C:
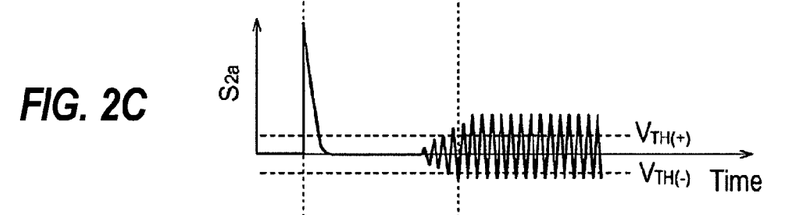
FIG. 2C is an input with the normal phase to the post-amplifier.
Figure 2D:
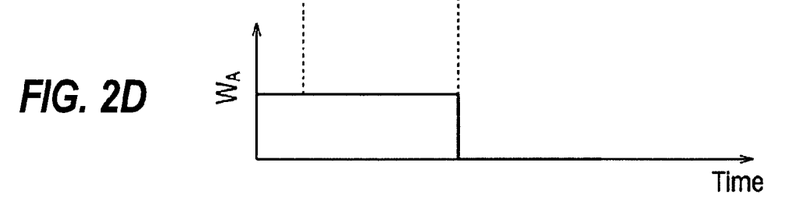
FIG. 2D is an output from the comparator.

FIGS. 2A to 2D are time charts of the optical input signal $O_{IN}$, that of the normal phase signal S1a of the pre-amplifier 3, that of the normal phase signal S2a input to the post-amplifier 5, and that of the output $W_A$ from the first comparator 12a, respectively. As shown in FIG. 2B, just after the optical input signal $O_{IN}$ recovers from the LOS state at t=t1, the normal phase signal S1a saturates in the maximum level because the gain of the pre-amplifier 3 becomes the maximum within the time defined by the time constant for varying the variable gain of the pre-amplifier 3. In this state, because the normal phase signal S2a is the differentiation of the signal S1a, the normal phase signal S2a causes a positive pulse just after the recovery of the optical input $O_{IN}$. Subsequently, the variable gain of the pre-amplifier 3 becomes operable, the magnitude of the normal phase S1a becomes stable at the time t=t2 and the minimum thereof is less than the first reference $V_{TH(-)}$. Consequently, the output $W_A$ of the comparator 12a switches form the "H" level to the "L" level at t=t2 as shown in FIG. 2D. At t=t1, the switching of the output $W_A$ does not occur because the normal phase signal S2a does not fall below the first reference $V_{TH(-)}$.

Figure 3A:
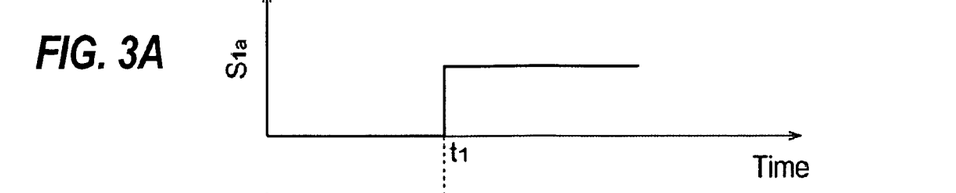
FIG. 3A is an output with the normal phase from the pre-amplifier.
Figure 3B:
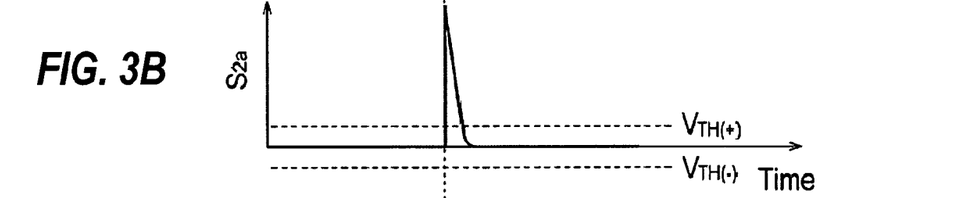
FIG. 3B is the input with the normal phase to the post-amplifier.
Figure 3C:
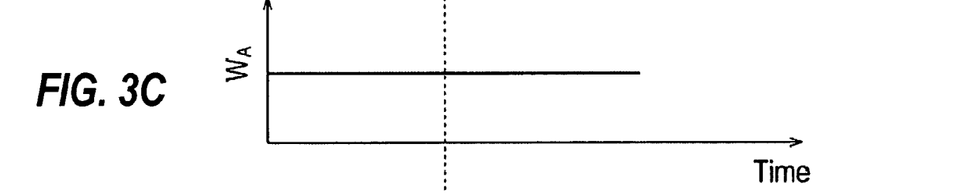
FIG. 3C is an output from one of the comparator.
Figures 3D, 3E:
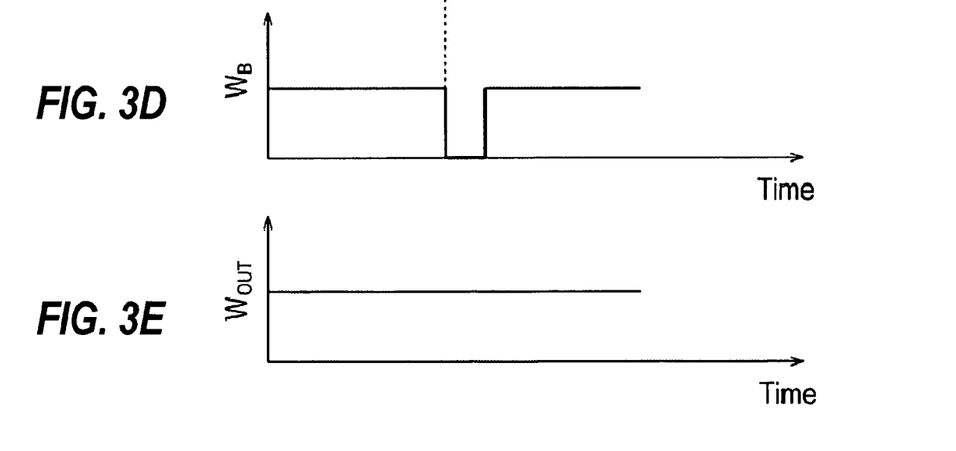
FIG. 3D is an output of the other of the comparator.
FIG. 3E is the LOS alarm signal output from the selector.
Figure 4A:
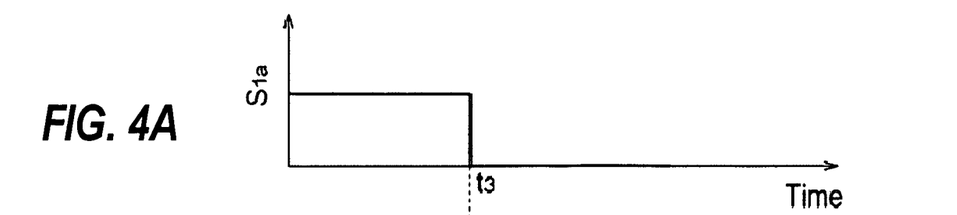
FIG. 4A is the output with the normal phase from the pre-amplifier.
Figure 4B:
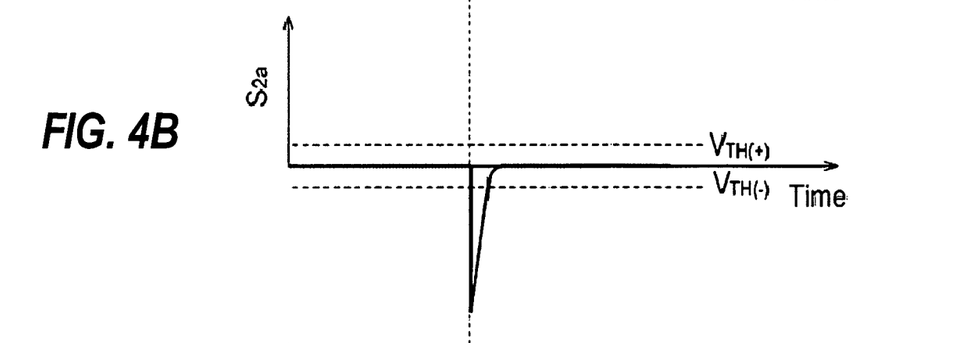
FIG. 4B is the input with the normal phase to the post-amplifier.
Figure 4C:
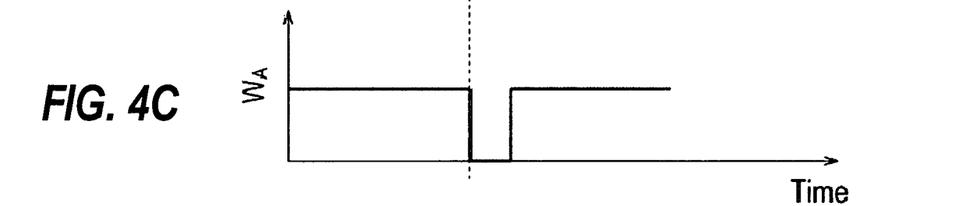
FIG. 4C is the output from one of the comparator.
Figure 4D:
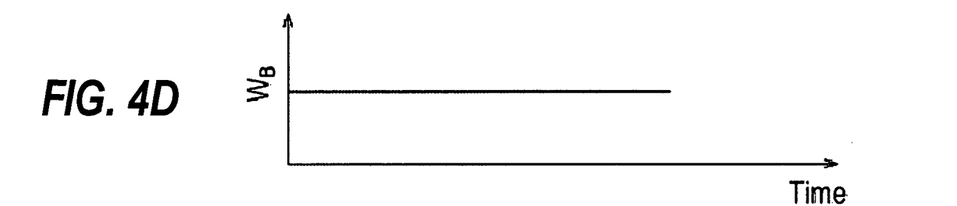
FIG. 4D is the output from the other of the comparator.
Figure 4E:
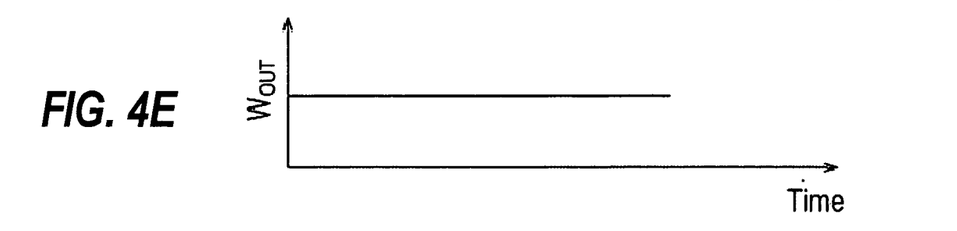
FIG. 4E is the LOS alarm output from the selector.

FIGS. from 3A to 3E show, when the output of the pre-amplifier 3 changes as a step-like signal, time charts of the normal phase output S1a of the pre-amplifier, that of the normal phase input S2a to the post-amplifier, that of the output $W_A$ from the first comparator 12a, that of the output from the second comparator $W_B$, and that of the LOS alarm $W_{OUT}$, respectively. When the normal phase output S1a shows the step-like behavior at t=t1, as shown in FIG. 3A, the output $W_A$ from the first comparator 12a keeps its "H" level, shown in FIG. 3C. While, the output $W_B$ from the second comparator 12b is temporarily set in the "L" level because the normal phase input S2a exceeds the second reference $V_{TH(+)}$, shown in FIG. 3D. However, the selector 13 selects the output $W_A$ of the first comparator at t=t1 because the output $W_{OUT}$ thereof is set to "H" level at t=t1−Δt. Consequently, the output $W_{OUT}$, which is the LOS alarm, may be kept in the "H" level around t=t1, as shown in FIG. 3E.

FIGS. 4A to 4D show time chars, when the output S1a from the pre-amplifier 3 decreases in a step-like behavior, of the normal phase output S1a of the pre-amplifier 3, that of the normal phase input S2a to the post-amplifier 5, that of the output $W_A$ from the first comparator 12a, that of the output $W_B$ from the second comparator 12c, and that of the LOS alarm $W_{OUT}$ output from the selector 13. This situation, namely, the step-like decrease of the output from the pre-amplifier 3, may occur when the intensity of the optical signal $O_{IN}$ gradually decreases from an ordinary level to a level where the variable gain of the pre-amplifier becomes the maximum. When the step-like decrease in the normal phase output S1a from the pre-amplifier 3 occurs at t=t3, shown in FIG. 4A, the output $W_A$ of the first comparator 12a temporarily changes to the "L" level because the normal phase input S2a of the post-amplifier 5 becomes less than the first reference $V_{TH(-)}$. While the output $W_B$ of the second comparator 12b keeps the "H" level around t=t3. The selector 13 selects the output $W_B$ from the second comparator 12b around t=t3 because the intensity of the optical input $O_{IN}$ is normal and the level of the LOS alarm, namely, the output of the selector 13 is set in the "L" level at t=t1−Δt. Accordingly, the LOS alarm $W_{OUT}$ can be maintained in the "H" level around t=t3.

Next, the operation of the optical receiver according to the present invention will be compared with that of a conventional receiver 901.

Figure 5:
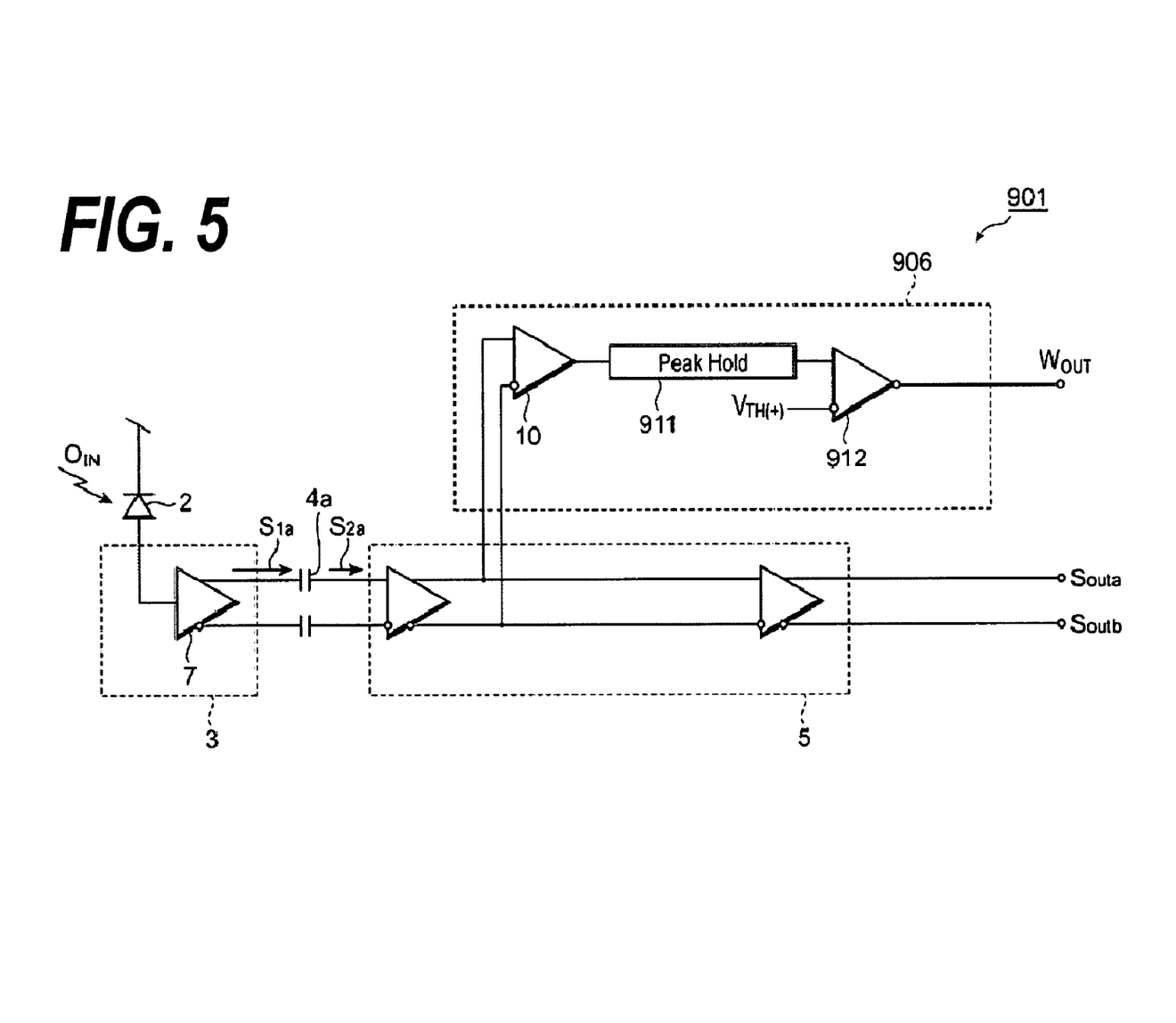
FIG. 5 is a circuit diagram of a conventional optical receiver.
Figure 6A:
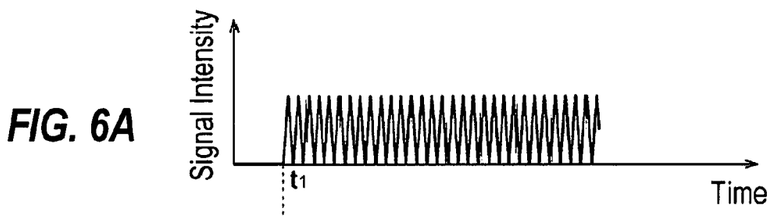
FIG. 6A is the intensity of the optical input signal.
Figure 6B:
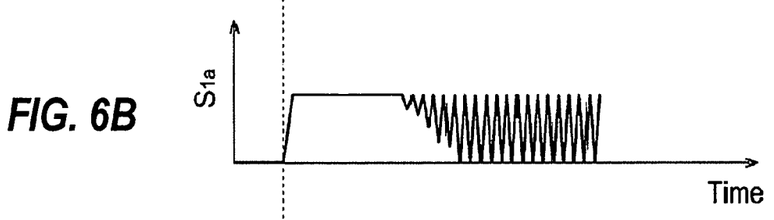
FIG. 6B is the output with the normal phase from the pre-amplifier.
Figure 6C:
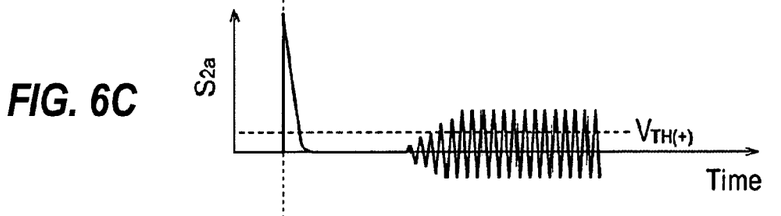
FIG. 6C is the input with the normal phase to the post-amplifier.
Figure 6D:
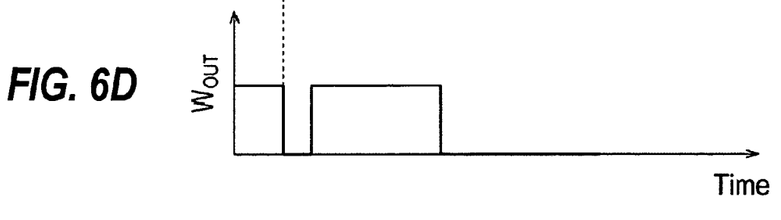
FIG. 6D is the LOS alarm output from the LOS detector.

FIG. 5 shows a block diagram of a conventional optical receiver 901, where the LOS detector 906 in the conventional receiver 901 provides only peak hold 911 connected with the differential circuit 10 and the output of the peak hold 911 is led to the non-inverting input of the comparator 912. The inverting input of the comparator 912 receives the reference $V_{TH(+)}$, and the output of the comparator 912 is brought to the outside of the receiver as the LOS alarm $W_{OUT}$.

FIGS. from 7A to 7D show time charts in the conventional optical receiver 901. Similar to the optical receiver 1 shown in FIG. 1, just after the recovery of the optical input signal $O_{IN}$ from the LOS state at t=t1, the normal phase output S1a shows a step-like increase, while, the normal phase signal S2a of the post-amplifier causes a positive pulse at t=t1, which results in a state that the peak signal from the peak hold 911 exceeds the second reference $V_{TH(+)}$, as shown in FIG. 7C. Thus, the optical receiver 901 temporarily resets the LOS alarm as shown in FIG. 7D.

Contrary to such a conventional optical receiver shown in FIG. 6, the optical receiver 1 according to the present invention sets the output $W_A$ of the comparator 12a in the LOS detector 6 when the minimum of the normal phase signal S1a exceeds the first reference $V_{TH(-)}$. The normal phase signal S1a is derived from the photo-current converted by the light-receiving device 1 from the optical input signal $O_{IN}$. Thus, even when the normal phase signal S1a varies in step-like when the optical input signal $O_{IN}$ recovers from the LOS state, the optical receiver 1 may not make an error to detect the positive pulse possibly occurred in the normal phase signal S3a. Accordingly, the optical receiver 1 can reliably detect the recovery from the LOS state in the optical input signal.

Moreover, because the optical receiver of the present invention may provide the peak hold 11b and the second comparator 12b, the receiver 1 may be protected to detect a negative pulse in the normal phase output S3a even when the normal phase output S1a varies in step-like at the interruption of the optical input signal $O_{IN1}$, accordingly, the receiver 1 can reliably detect the transition of the optical signal $O_{IN}$ to the LOS state.

While features of the embodiments have been illustrated as described herein, many modifications, substitutions, changes and equivalents will now occur to those skilled in the art. For instance, the receiver can reliably detect the recovery from the LOS state even if the LOS detector 6 may omit the peak hold 11b and the second comparator 12b. It is, therefore, to be understood that the appended claims are intended to cover all such modifications and changes as fall within the true spirit of the embodiments.

What is claimed is:

1. An optical receiver comprising:
   a light-emitting device for receiving an optical signal and converting the optical signal into a corresponding photo-current;
   a pre-amplifier for converting the photo-current into an electrical signal; and
   a detector for detecting, based on an output of the pre-amplifier, a decrease of intensity of the optical signal, said detector being coupled with the pre-amplifier through a coupling capacitor,
   wherein the detector includes,
   a bottom hold configured to detect and hold a minimum level of the output of the pre-amplifier,
   a peak hold configured to detect and hold a maximum level of the output of the pre-amplifier,
   a first comparator configured to generate, by comparing an output of the bottom hold with a first reference, a first alarm when the output of the pre-amplifier is greater than the first reference,
   a second comparator configured to generate, by comparing an output of the peak hold with a second reference, a second alarm when the output of the peak hold is less than the second reference, and
   a selector configured to select one of the first alarm and the second alarm and to output an alarm signal in accordance with a state of the alarm signal output from the selector,
   wherein said alarm signal selected by said selector switches said selector so as to select the other of the first alarm and the second alarm.

2. An optical receiver for converting an optical signal into an electrical signal corresponding to the optical signal, comprising:
   a light-emitting device configured to receive the optical signal and to convert the optical signal into a photocurrent;
   a pre-amplifier configured to convert the photocurrent into the electrical signal; and
   a detector for detecting a maximum level and a minimum level of an output provided from the pre-amplifier through a coupling capacitor, wherein the detector includes:
   a bottom hold configured to detect and hold the minimum level,
   a peak hold configured to detect and hold the maximum level, a first comparator configured to compare the minimum level with a first reference and to output a first alarm when the minimum level is less than the first reference, a second comparator configured to detect and hold the maximum level with a second reference and to output a second alarm when the maximum level is greater than the second reference, and a selector configured to select one of the first alarm and the second alarm and to output an alarm signal, wherein the detector generates an alarm signal by sequentially comparing one of the maximum level and the minimum level with a first reference and comparing the other of the maximum level and the minimum level with a second reference, and the alarm signal switches the selector so as to select the other of the first alarm and the second alarm.

* * * * *